May 26, 1959 P. S. BRANDON ET AL 2,888,651

PHASE SHIFT DEVICES

Filed May 8, 1953

INVENTORS:
Percy Samuel Brandon
Peter Maurice Wright
ATTORNEYS:
Baldwin & Wight

United States Patent Office 2,888,651

Patented May 26, 1959

2,888,651

PHASE SHIFT DEVICES

Percy Samuel Brandon, Chelmsford, and Peter Maurice Wright, Butlers, Littley Green, Great Waltham, England, assignors to Marconi's Wireless Telegraph Company Limited, London, England, a company of Great Britain Application May 8, 1953, Serial No. 353,808

Claims priority, application Great Britain May 13, 1952

5 Claims. (Cl. 333—31)

This invention relates to phase shift devices and has for its object to provide improved phase shift devices, suitable for use or micro-waves, which will give a large variation of phase shift in response to a small variation in input frequency. Such devices are frequently required in micro-wave technique for example in the frequency determining element of a frequency discriminator of the kind in which an incoming signal is divided between two channels one of which contains the frequency determining element, which are then re-united to provide a combined output whose amplitude and phase are a function of frequency. It is common, at present, to employ a resonant circuit such as a resonant cavity as the frequency determining element in such a frequency discriminator but this has the defect that the amplitude characteristic is also dependent upon frequency. This defect can be avoided by using a long length of line shorted at its far end (i.e. the end remote from the input) as the frequency determining element but such an arrange- is apt to be most inconveniently bulky.

According to this invention a phase shift device consists of a wave guide member short circuited at one end with part of its length bent up into a loop of at least one complete turn, a directional coupler coupling the parts of said guide which are adjacent to one another at the beginning and end of the turn, and means for feeding input waves into and taking phase shifted output waves out of the other end.

If a device in accordance with this invention is of fixed length electrically it will give a large variations of phase shift in response to a change in input frequency. It may, however, be made of variable electrical length in which case large variation of phase shift may be produced by varying the electrical length. Such variation in electrical length may be effected mechanically, as by providing, at a suitable point in the length of the turn, a piece of non-lossy dielectric material arranged to be insertable, to an adjustable extent, into the guide through a slot in the wall thereof or it may be effected electrically as by means of a gas discharge tube inserted in the length of the turn so that the gas discharge space is inside the guide whose electrical length may thus be varied by varying the discharge. Such expedients for varying the electrical length will be herein termed "line stretchers" the variably insertable dielectric arrangement being an example of a mechanical line strecther and the controllable inserted gas discharge tube arrangement being an example of an electrical line strecther. Line stretchers are, of course, known per se. Where a line stretcher is incorporated variation thereof will produce, for a given input frequency, a large variation in output phase in relation to input phase e.g. for phase modulation purposes.

The invention is illustrated in the accompanying drawings in which.

Figure 3:
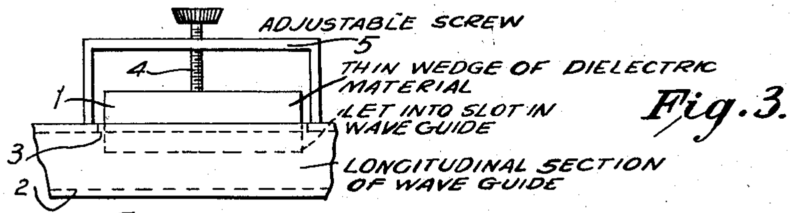
Figures 2, 4:
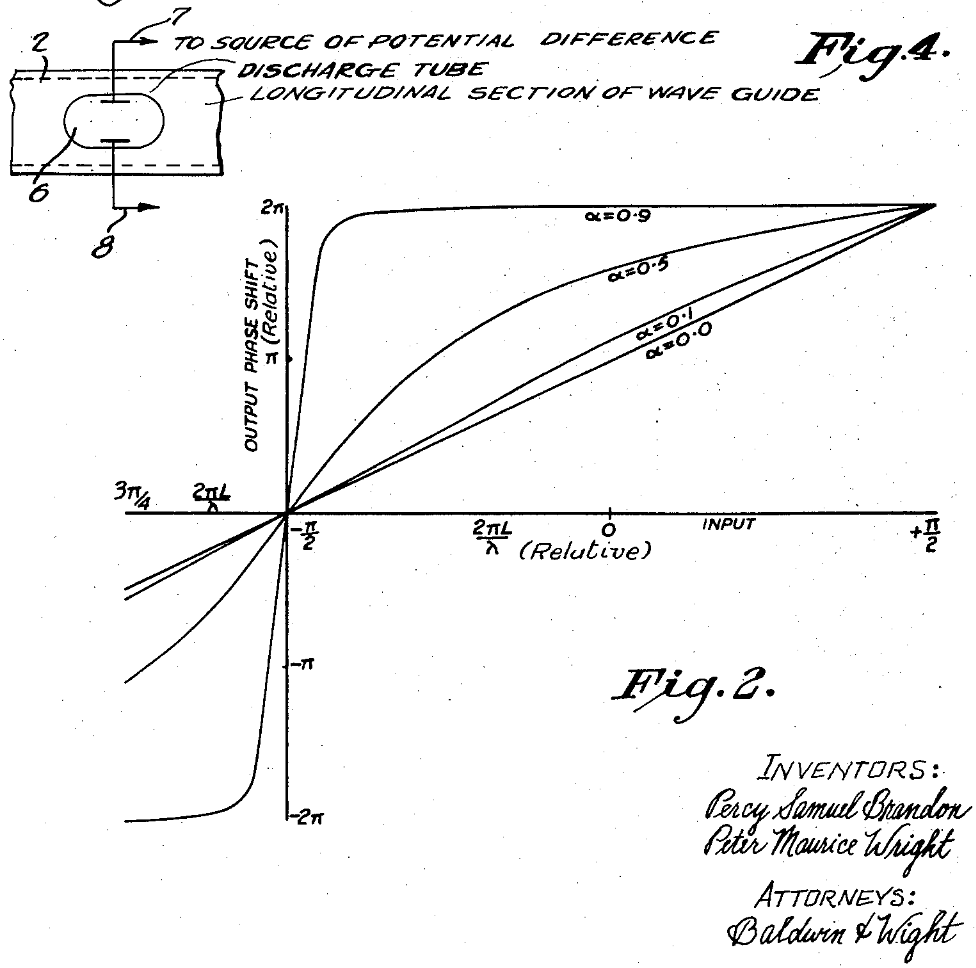
Fig. 2 is a graphical figure showing the nature of the results achievable.

Fig. 3 schematically illustrates one form of mechanical line stretcher which may be employed in the system of our invention; and Fig. 4 schematically shows a form of electrical line stretcher that may be employed for controlling the effective electrical length of the system of our invention.

Figure 1:
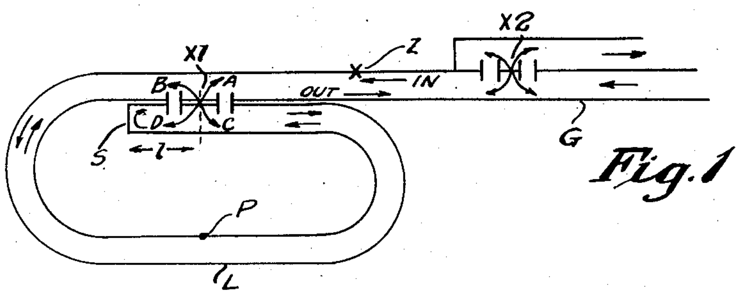
Fig. 1 represents one embodiment diagrammatically.

Referring to Figure 1 the device therein shown consists essentially of a length of wave guide G part of which is bent up into a complete turn of length L, the guide continuing for a short distance $l$ beyond the end of the complete turn and being short-circuited as indicated at reflector S. The structural cooperative relationship between the common input and output wave guide member G and the further wave guide member $l$ will be understood from Fig. 1 where the further wave guide member $l$ is a continuance of the end of the complete turn of the length of the wave guide connected through the directional coupler X1. The length $l$ is sufficiently long to eliminate any interference which would be produced by the generation of unwanted modes in the energy reflected from the reflector S. In the actual operation a phase shift is produced by the length $l$ which is equal to $4\pi l$ over $\lambda$ in the output of the device. Once this particular length of $l$ has been passed the effect of the extension is to add delay in the reflected wave which is passed to the output wave guide. For this reason the length $l$ is arbitrary for any length beyond this certain minimum length. Furthermore there will be a certain amount of attenuation and for this reason the extension $l$ shall not be too long. In actual practice the extension $l$ is made as short as possible for the express purpose of avoiding excessive attenuation or delay. A directional coupling X1 is provided between the parts of the guide at the beginning and end of the complete turn. The energy paths in the directional coupler are represented by arrow heads, the ends of the coupler being indicated by the letters A, B, C, D. Input and reflected output waves are fed into and received from the wave guide turn as indicated by the arrows In and Out. A directional coupler X2 enables energy to be fed into and phase shifted energy to be taken out of the device. The object of the directional coupler X2 is to separate the incoming and the outgoing waves. This directional coupler X2 is connected with the means for feeding input waves into the common wave guide member G and for taking out phase shifted waves therefrom.

Fig. 2 shows graphically the nature of the results achievable with a device as shown in Fig. 1. In Fig. 2 each curve shows the relative phase change of the output wave relative to the input wave for relative variation of $$\frac{2\pi L}{\lambda}$$

where $\lambda$ is the input wave length, each curve being drawn for a different value of $\alpha$ the coupling co-efficient of the coupler X1. For convenience each is drawn to pass through the origin. The curves of Fig. 2 are drawn for input and output waves at a point such as Z i.e. a point such that the directional coupler X2 (which is normally of as high a coupling co-efficient as possible) does not enter into the matter. As will be apparent from Fig. 2 the phase shift has maximum rate of change with $$\frac{2\pi L}{\lambda}$$

given by $$\frac{1+\alpha}{1-\alpha}$$

Thus if $\alpha$ is made nearly unity very rapid shifts of phase for a very small change of input frequency are achievable. The coupling factor for the directional couplers is explained in Fig. 2 where the coupling factor is shown as $\alpha$ and this provides the different degrees of phase variations. The operation of the directional coupler X2 is such that as much energy as possible passes from the wave guide G into the output wave guide through the directional coupler X2 when this energy is passing in the direction of the arrow. It is necessary for as little energy as possible to pass to the output wave guide from the input energy.

The phase shift in the complete turn of the wave guide of length L corresponds to the phase shift indicated along the abscissa shown in Fig. 2. We have heretofore indicated that the phase shift due to the length of the further wave guide $l$ adds a specified phase shift in the output. It is desirable to have the origins of the curves for the coupling factor $\alpha$ at the points of maximum slope as shown in Fig. 2. Under such conditions the length of the complete turn of the wave guide indicated at L in Fig. 1 is equal to:

$$L=n\lambda\pm\frac{\lambda}{2\pi}$$

The wave energy incident upon the directional coupler X2 is directed into the common wave guide G from the right hand side of the diagram shown in Fig. 1 passing in the direction of the arrow indicated at In where the wave energy passes into the directional coupler X1 and then surrounds the complete turn of the loop wave guide L through the directional connection to the further wave guide $l$ where the energy is reflected from the short circuited end S and returned through the further wave guide and the loop wave guide and the directional coupler X1 at shifted phase into the common wave guide G in the direction of the arrow Out and through the directional coupler X2 which separates the incoming and outgoing wave energy.

If desired a mechanical or electrical line stretcher as shown respectively in Figs. 3 and 4 may be incorporated in the wave guide turn e.g. at a point such as P. Such a line stretcher may be of any convenient form known per se e.g. as already described herein. For example in Fig. 3 the line stretcher may be mechanical, comprising the piece of non-lossy dielectric material 1 insertable into and removable from the wave guide section 2 through slot 3. The material 1 is adjustably advanced or retracted under control of adjustable screw operating in suitable bracket 5 and attached to the material 1 as shown. The line stretcher may be electrical as shown in Fig. 4 consisting of the gas discharge tube 6 inserted in the length of the section 2 of the wave guide. The gas discharge space in tube 6 is centered within the section 2 of the wave guide and the discharge varied by applying variable potential to the terminals 7, 8. By means of such a line stretcher a very large change of phase of output relative to input can be obtained by a very small change of electrical length of the turn. For instance, referring to Fig. 2, it will be seen that if $\alpha=0.9$ a change of line length of substantially $$\frac{\lambda}{32}$$

will produce a change of relative phase of $2\pi$.

The method of operation of the device may be explained as follows: if $\alpha$ is the voltage transfer ratio of "crossing" in the coupler X1 (i.e. from A to D; D to A; B to C; or C to B) then $\sqrt{1-\alpha^2}$ is the "carry on" voltage ratio (i.e. from A to B; B to A; C to D; or D to C). Let $\alpha$ be very near unity (as in practice it is chosen to be) so that most voltage is "crossed over." Then most of the input from A crosses over to D, is reflected back from S and most of the reflected energy goes back to D and then to A and out. This energy will amount to $\alpha^2$ of the input. Some of the input will, however, carry on from A to B with reduced amplitude $\sqrt{1-\alpha^2}$, then in an anti-clockwise direction round the turn. At C this energy divides, most of it crossing over to B, (reduced by a further factor $\alpha$) and carry on again round the turn to be again guided to point C when again most of it will cross over to B with a further reduction by the factor $\alpha$ . . . and so on. This part of the energy thus repeatedly travels round the turn in the same direction (anti-clockwise in the drawing) and, assuming no loss in the turn itself, is multiplied by the factor $\alpha$ each time.

That is to say, each time that the energy travels around the turn in the wave guide, the energy is multiplied by the coupling factor of the directional coupler each time the energy encircles the turn in the wave guide. The phase at which the wave leaves the system is dependent upon the wave length employed and the coupling factor of the directional coupler. The nearer $\alpha$ is to unity the more the number of times this wave travels round until it has been reduced to a given proportion e.g. 1% of its original amplitude.

Each time, however, this wave passes the coupler X1 a small fraction $\sqrt{1-\alpha^2}$ thereof carries on from point C past D to the short circuited guide end S from which it is to be reflected back to D. Most of this will cross over to A with further reduction due to the factor $\alpha$ as it crosses from D to A. The small amplitude waves must all add together and their sum, together with the directly reflected wave, must all add vectorially (assuming no losses) to a value equal to the input amplitude. It may be shown vectorially that the minimum value of the sum of the small amplitude reflections occurs when it is in phase with the directly reflected wave and that the maximum occurs when the amplitude of the sum is in anti-phase to the directly reflected wave and/or nearly twice its amplitude (actually $1+\alpha^2$ times that amplitude). The phase of the resultant varies from $+180°$ to $-180°$ in relation to the direct reflected wave in dependence on the amplitude of the sum.

If $\alpha$ is nearly unity and L is an integral number of wave lengths all the small amplitude reflected waves will add in amplitude to very nearly the maximum value. If however L is a little different from an integral number of wave lengths then each reflection corresponding to each successive anticlockwise circulation of the turn will differ in phase from the next by the same amount. The amplitude of the vector sum will therefore no longer be a maximum. The larger the number of circulations the quicker will the sum amplitude reduce for a given departure of L from an integral number of wave lengths. The nearer $\alpha$ is to unity the quicker will the phase of the total resultant reflected energy swing through 180° for a given departure in L from an integral number of wavelengths.

It should be noted that the maximum possible phase change is $\pm180°$ and that this can occur for a very small change in L (in terms of the wavelength). Once this limit ($+180°$ or $-180°$) has been reached the phase shift remains nearly constant with further change of L in terms of wave length until the next integral multiple of the wave length is approached.

While we have described our invention in certain preferred embodiments, we realize that modifications may be made, and we desire it to be understood that no limitations upon our invention are intended other than may be imposed by the scope of the appended claims.

We claim:

1. A phase shift device comprising a common input and output wave guide member, a loop wave guide member connected at one end portion with the aforesaid wave guide member, said loop wave guide member being bent into at least one complete turn and terminating in an end portion, a directional coupler interposed between said end portions of said loop wave guide member and said common input and output wave guide member, the phase shift required being dependent upon the length of said loop wave guide member, the operational frequency, and the coupling factor of the directional coupler, a further wave guide member connected with the terminating end portion of said loop wave guide member, said further wave guide member being extended beyond the terminating end portion of the complete turn of the loop wave guide member and ending in a short circuited terminus, the length of said further wave guide member being selected to substantially eliminate interference from unwanted modes in the energy reflected from said short circuited terminus, means for feeding input waves into said common wave guide member, means for taking out phase shifted waves therefrom and a directional coupler connected with said means for separating the input waves from the phase shifted waves.

2. A phase shift device as set forth in claim 1 wherein the loop wave guide member is of fixed electrical length.

3. A phase shift device as set forth in claim 1 wherein the loop wave guide member incorporates a line stretcher whereby it is made of variable electrical length.

4. A phase shift device as set forth in claim 1 wherein the loop wave guide member includes a line stretcher of fixed electrical length, said line stretcher including a piece of non-lossy dielectric material arranged to be insertable, to an adjustable extent, into the wave guide member through a slot in the wall thereof.

5. A phase shift device as set forth in claim 1 wherein the loop wave guide member constitutes a line stretcher of fixed electrical length, said line stretcher including a gas discharge tube inserted in the length of the turn so that the gas discharge spaced is disposed inside the loop wave guide member whose electrical length may thus be varied by varying the discharge.

References Cited in the file of this patent

UNITED STATES PATENTS

| | | |
|---|---|---|
| 2,532,157 | Evans | Nov. 28, 1950 |
| 2,591,258 | Herschberger | Apr. 11, 1952 |
| 2,605,413 | Alvarez | July 29, 1952 |
| 2,636,116 | Taylor | Apr. 21, 1953 |
| 2,728,050 | Van De Lindt | Dec. 20, 1955 |
| 2,757,366 | Zaleski | July 31, 1956 |
| 2,762,871 | Dicke | Sept. 11, 1956 |

FOREIGN PATENTS

| | | |
|---|---|---|
| 663,065 | Great Britain | Dec. 19, 1951 |